(12) United States Patent
Oriakhi et al.

(10) Patent No.: US 7,258,736 B2
(45) Date of Patent: Aug. 21, 2007

(54) CALCIUM ALUMINATE CEMENT COMPOSITIONS FOR SOLID FREEFORM FABRICATION

(75) Inventors: Christopher Oriakhi, Corvallis, OR (US); Terry M. Lambright, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

(21) Appl. No.: 10/603,405

(22) Filed: Jun. 24, 2003

(65) Prior Publication Data

US 2004/0261664 A1    Dec. 30, 2004

(51) Int. Cl.
*C04B 7/32*    (2006.01)
(52) U.S. Cl. .............. 106/692; 106/696; 264/333; 427/427
(58) Field of Classification Search ............. 264/333; 427/427; 106/692, 696
See application file for complete search history.

(56) References Cited

U.S. PATENT DOCUMENTS

| | | | | |
|---|---|---|---|---|
| 3,179,730 | A * | 4/1965 | Ingrassia | 264/245 |
| 4,696,851 | A * | 9/1987 | Pryor | 428/210 |
| 5,204,055 | A | 4/1993 | Sachs et al. | |
| 5,387,380 | A | 2/1995 | Cima et al. | |
| 5,740,051 | A | 4/1998 | Sanders, Jr. et al. | |
| 5,902,441 | A | 5/1999 | Bredt et al. | |
| 6,146,567 | A | 11/2000 | Sachs et al. | |
| 6,165,406 | A | 12/2000 | Jang et al. | |
| 6,238,474 | B1 * | 5/2001 | Unsin | 106/692 |
| 6,259,962 | B1 | 7/2001 | Gothait | |
| 2001/0050031 | A1 * | 12/2001 | Bredt et al. | 106/162.9 |

FOREIGN PATENT DOCUMENTS

| | | |
|---|---|---|
| DE | 10158233 | 11/2001 |
| JP | 04363808 | * 12/1992 |
| JP | 07-246442 | 9/1995 |
| WO | WO98/51477 | 11/1998 |

OTHER PUBLICATIONS

"Interfacial structure and chemistry in a ceramic/polymer composite material", Popoola et al., ☐☐Journal of Materials Research (1992), 7(6), 1545-52.*
Lembo, John, "Three Dimensional Printing," Advanced Materials & Processes, Jan. 2002.
Brown, Paul Wencil, "Cements Research Progress 1990."
Blazdell, P.F. and J.R.G. Evans, "Preparation of Ceramic Inks for Solid Freeforming Using a Continuous Jet Printer," Journal of Materials Symthesis and Processing, vol. 7, No. 5, 1999.
Evans, J.R.G., "Direct Ink Jet Printing of Ceramics: Experiment in Teleology," British Ceramic Transactions, vol. 100, No. 3, 2001.
Song, Jin Hua, Mohan J. Edirisinghe, and Julian R.G. Evans, "Formulation and Multilayer Jet Printing of Ceramic Inks," Journal of the American Ceramic Society, 82 (12) 3374-80 (1999).
Merlin, Fabrice, Helene Lombois, Stephane Joly, Nicolas Lequeux, Jean-Louis Halary and Henri Van Damme, "Cement-polymer and clay-polymer nan- and meso-composites: spotting the difference," J. Mater. Chem., 2002, 12, 3308-3315.

* cited by examiner

*Primary Examiner*—Paul Marcantoni

(57) ABSTRACT

The present invention is drawn toward materials, methods and systems for solid free-form fabrication of three dimensional objects. In one embodiment, a method can comprise a) applying a particulate blend in a layer, wherein the particulate blend includes calcium aluminate particulates and polymeric binder particulates; b) dispensing an aqueous polyol-containing liquid vehicle onto a predetermined area of the particulate blend to form hydrated cement in the predetermined area; c) hardening the hydrated cement; and d) repeating steps a) through c) such that multiple layers of the cement are formed that are bound to one another, thereby forming the three dimensional object.

22 Claims, No Drawings

CALCIUM ALUMINATE CEMENT COMPOSITIONS FOR SOLID FREEFORM FABRICATION

FIELD OF THE INVENTION

The present invention is drawn to the free-form fabrication of three-dimensional compositions or objects created from calcium aluminum nanocomposite. These compositions can be prepared using an ink-jettable liquid vehicle for hydrating a particulate blend to form a layered cement composition.

BACKGROUND OF THE INVENTION

The efficient production of prototype three-dimensional compositions or objects can provide an effective means of reducing the time it takes to bring a product to market at a reasonable cost. A typical approach for preparing prototypes has required specific tooling, e.g., molds and dies, for the prototype, which can be a slow and cumbersome process.

Recently, computerized modeling has alleviated some of the need for building prototypes. Computer modeling can be carried out quickly, and provide a good idea of what a product will look like, without a specialized tooling requirement. However, the fabrication of a tangible object is still often preferred for prototyping. The merging of computer modeling and the physical formation of three-dimensional objects is sometimes referred to as desktop manufacturing. Various techniques that employ desktop manufacturing have been explored and described in the literature.

In this evolving area of technology, there has been a desire to provide new methods of manufacture that are relatively easy to employ, provide rigid structures, and are relatively quick in the formation of such three-dimensional compositions or objects. Thus, additional methods, systems, and/or compositions that meet these criteria would be an advancement in the art.

SUMMARY OF THE INVENTION

It has been recognized that certain methods and compositions can be used for free-form fabrication of three-dimensional objects. Specifically, a method for solid free-form fabrication of a three-dimensional object can comprise steps of a) applying a particulate blend in a layer, wherein the particulate blend includes calcium aluminate particulates and polymeric binder particulates; b) dispensing an aqueous polyol-containing liquid vehicle onto a predetermined area of the particulate blend to form hydrated cement in the predetermined area; c) hardening the hydrated cement; and d) repeating steps a) through c) such that multiple layers of the cement are formed that are bound to one another, thereby forming the three dimensional object.

In another embodiment, a system for solid free-form fabrication of three-dimensional objects can comprise a particulate blend of calcium aluminate particulates and polymeric binder particulates; and an aqueous polyol-containing liquid vehicle configured for hydrating the particulate blend to form a cement.

In another embodiment, a solid three-dimensional prototype composition can comprise multiple layers of cement deposited in contact with one another. The multiple layers of cement can each comprise a particulate blend including calcium aluminate particulates and polymeric binder particulates. The particulate blend can also be hydrated and hardened by use of an aqueous polyol-containing liquid vehicle.

Additional features and advantages of the invention will be apparent from the detailed description that follows, which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

Concentrations, amounts, molecular sizes, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 wt % to about 5 wt %" should be interpreted to include not only the explicitly recited concentration of about 0.1 wt % to about 5 wt %, but also include individual concentrations and the sub-ranges within the indicated range. Thus, included in this numerical range are individual concentrations such as 1 wt %, 2 wt %, 3 wt %, and 4 wt %, and sub-ranges such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

As used herein, "liquid vehicle" refers to the liquid fluid that can be prepared for jetting from ink-jet pen architecture. Liquid vehicles are well known in the ink-jet arts, and a wide variety of liquid vehicles can be used with the systems and methods of the present invention. Such liquid vehicles can include a mixture of a variety of different agents, including, water, surfactants, organic solvents and co-solvents, buffers, biocides, sequestering agents, viscosity modifiers, low molecular weight polymers, lithium ion sources, etc. In accordance with embodiments of the present invention, the liquid vehicle includes, at minimum, water and a polyol, such as glycerol, ethoxylated glycerol, or low molecular weight polyethylene glycol (about 200 Mw to 2000 Mw). Colorant can be added to the liquid vehicle as well in some embodiments.

There are many commercially available calcium aluminate cements that can be used in accordance with embodiments of the present invention. Many of these cements include not only calcium aluminate per se, but can include other components as well. For example, Fondu cement can include a predominant amount of calcium aluminate and a lesser amount of iron oxide, e.g., about 16 wt %. Alternatively, high-alumina cement (HAC) can also be used. HAC cement is often referred to generically as "calcium aluminate cement." However, the use of the term "calcium aluminate cement," in accordance with embodiments of the present invention, is intended to include hydrated particulate blends that predominantly contain calcium aluminate with respect to other single dry components present in the dry cement mix. Further, the term "cement" is not used herein with respect to dry particulate blends.

The term "dry cement mix" is used to describe dry particulate blends that can be hydrated to form a cement.

The term "polyol" refers to compositions having at least three hydroxyl groups, and which can be formulated for jetting from an ink-jet pen. Examples include glycerol, ethoxylated glycerol, as well as low molecular weight hydroxyl-containing polymers, such as polyethylene glycol.

The term "particulate" includes fine dry powders and/or crystals.

The term "colorant" includes both pigments and dyes.

The term "shrinkage minimizing agent" refers to compositions that can be included in liquid vehicles, in accordance with embodiments of the present invention, which reduce the size or alter the shape of the cement upon drying.

The terms "harden" or "hardening" includes a state of cement setting from the beginning stages of setting to a completely hardened state.

With these definitions in mind, a method for solid free-form fabrication of a three-dimensional object can comprise steps of a) applying a particulate blend in a layer, wherein the particulate blend includes calcium aluminate particulates and polymeric binder particulates; b) dispensing, by means of a dispensing tool, such as, but not limited to, an ink-jet pen, an aqueous polyol-containing liquid vehicle onto a predetermined area of the particulate blend to form hydrated cement in the predetermined area; c) hardening the hydrated cement; and d) repeating steps a) through c) such that multiple layers of the cement are formed that are bound to one another, thereby forming the three dimensional object. To function most effectively, the dispensed fluid should penetrate the powder layer sufficiently far so that powder from the underlayer is wet enough for adhesion between layers or so that there is sufficient fluid still present at the top surface.

In one embodiment, a further step of removing a portion of the particulate blend that does not form the hydrated cement can be carried out. This step can occur after every layer is formed, or can occur periodically after multiple layers are formed, or can occur once at the end of the process. The step of hardening can be accelerated by the use of a lithium ion source. The lithium ion sources can be present as a particulate in the particulate blend, and/or can be solvated by the liquid vehicle. Multiple lithium ion sources can be present in one or both of the particulate blend and the liquid vehicle.

In an alternative embodiment, a system for solid free-form fabrication of three-dimensional objects can comprise a particulate blend of calcium aluminate particulates and polymeric binder particulates; and an aqueous polyol-containing liquid vehicle configured for hydrating the particulate blend to form a cement. In a preferred embodiment, the aqueous polyol-containing liquid vehicle is ink-jettable. The use of the polymeric binder particulates can provide for crosslinking reactions with the calcium aluminate, thereby improving hardening and strength-building of the three-dimensional composition or object. In one embodiment, the liquid vehicle can be housed by a dispensing tool, such as, but not limited to, an ink-jet pen, configured for dispensing the liquid vehicle onto the particulate blend. A substrate can also be present that is configured for carrying the particulate blend in a defined region. The defined region can be configured with respect to the dispensing tool such that the liquid vehicle, upon being dispensed from the dispensing tool, contacts the particulate blend. In another embodiment, the system can be configured for applying multiple cement layers in succession to form a three-dimensional object. Layers can be applied sequentially by modifying, e.g., raising, the position of the dispensing tool with respect to the substrate, and/or by modifying, e.g., lowering, the position of the substrate with respect to the dispensing tool. Other than the presence of the polyol, appropriate components for inclusion in the liquid vehicle can include water, lower saturated aliphatic alcohols, and surfactants. Colorant can also be present to impart color to one or more layer of the three-dimensional object formed.

In another embodiment, a solid three-dimensional prototype composition, can comprise multiple layers of cement deposited in contact with one another. Each of the multiple layers of cement can comprise a particulate blend including calcium aluminate particulates and polymeric binder particulates that are hydrated and hardened by the use of an aqueous polyol-containing liquid vehicle. In a preferred embodiment, the aqueous polyol-containing liquid vehicle is ink-jettable. In this embodiment, the composition can have an average pore size less than about 10 microns, once formed and substantially dried. Additionally, upon drying, such a composition can substantially retain its size and form without excessive shrinkage.

With respect to the methods, systems, and compositions described herein, various embodiments in accordance with the present invention can be practiced. For example, the calcium aluminate particulates can be present in the particulate blend at from 40 wt % to 95 wt %. Additionally, the calcium aluminate particulates can have an average particulate size from 10 microns to 100 microns. Other particulate components can also be present in the particulate blend, such as ordinary Portland dry cement mix, ferrite dry cement mix, sulfoferrite, sulfoaluminaoferrite, nanofillers, plasticizers, crosslinking agents, and drying and setting accelerators.

In one embodiment, a lithium ion source can be present as part of the particulate blend and/or the polyol-containing liquid vehicle. Examples of appropriate lithium ion sources that can be used include lithium citrate, lithium carbonate, lithium formate, and/or lithium hydroxide. Lithium ions in hydrated cement can act to accelerate drying and/or hardening by associating with multiple water molecules in the cement. Certain compositions, such as lithium citrate, can also be useful as the citrate ion also can also participate in the performance of the cement. For example, citrate ions can play a role in cement network formation and crosslinking of polymers within the composition.

As previously mentioned, polymeric binder particulates can also be present in the particulate blend. Examples of such polymeric binder particulates include 75% to 100% hydrolyzed polyvinyl alcohol powder, polyacrylamide powder, poly(acrylic acid), poly(acrylamide-co-acrylic acid), poly(vinyl alcohol-co-ethylene), poly(vinyl alcohol-co-vinyl acetate-co-itaconic acid), poly(vinyl pyrrolidone), poly (methylmethacrylate-co-methacrylic acid), soluble starch, methylcellulose, and combinations thereof. In one embodiment, the weight average molecular weight of such polymeric binder particulates can be from 2,000 Mw to 1,000,000 Mw. In another embodiment, the polymeric binder particulates can be from 2,000 Mw to 100,000 Mw. The polymeric binder particulates can have an average particulate size from 0.5 microns to 80 microns.

With respect to the liquid vehicle that can be used, an ink-jettable polyol-containing liquid vehicle is provided in accordance with embodiments of the present invention. Examples of polyols that can be used alone or in combination include glycerol, ethoxylated glycerol, and from 200 Mw to 2000 Mw polyethylene glycol. The polyol, in addition to enhancing the hydration and solubility properties of the polymeric binder particulates and calcium aluminate particulates during the cement formation, can complex with metal ions released from the calcium aluminate. Consequently, the mechanical properties of a finished cement composition or object can be further improved.

In addition to the polyol, a low molecular weight polymer (other than the polyol) having a weight average molecular weight from 200 to 2000 can also be present in the liquid vehicle. Such polymers can provide binding properties similar to the high molecular weight particulates that can be present in the particulate blend. Lower molecular weight polymers are used in the liquid vehicle due to jettability considerations, as is generally known in the ink-jet arts. The principle fluidic parameter affected by molecular weight is viscosity. In a preferred embodiment, the liquid vehicles used should have viscosities in the range of 1-10 cPs. Polymers that can be present in the liquid vehicle include 200 Mw to 2000 Mw polyethylene glycol (which can also be the polyol as defined herein) and poly(vinyl alcohol-co-acetate) copolymer, for example.

The liquid vehicle can also include a shrinkage minimizing agent. These agents can include organic co-solvents that minimize reduction in size and/or shape upon drying of the cement. Exemplary shrinkage minimizing agents include 2,5-dimethylpropanediol and/or pentaerythriol. Regardless of whether there is a shrinkage minimizing agent present, the liquid vehicle can be pH balanced to from 7.0 to 10.0 and in a preferred embodiment balanced to from 7.0 to 8.5. Lithium hydroxide can be used for this purpose, and also can provide the additional function of providing a lithium ion to the liquid vehicle for accelerating drying of the cement.

Other components can be present in the liquid vehicle, such as those commonly used in ink-jet ink formulations. For example, the liquid vehicle can also include a colorant, such as a pigment and/or a dye to provide color to one or more layers of the solid three-dimensional object.

A typical liquid vehicle formulation that can be used with the present invention can include one or more organic solvents or co-solvents, present in total at from 5.0% to 50.0% by weight, and one or more non-ionic, cationic, and/or anionic surfactants, present from 0.01% to 10.0% by weight. The balance of the formulation can be purified water, or other vehicle components known in the art such as biocides, viscosity modifiers, materials for pH adjustment, sequestering agents, preservatives, and the like.

Classes of organic solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol. The polyol having at least three hydroxyl groups can be present in addition to the above-listed, or other similar, co-solvents.

One or more of many surfactants can also be used which are known by those skilled in the art of ink formulation. These surfactants may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like.

Consistent with the formulation of this invention, various other additives can be used to optimize the properties of the composition for specific applications. Examples of these additives are those added to inhibit the growth of harmful microorganisms. These additives may be biocides, fungicides, and other microbial agents, which are routinely used in ink-jettable formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the liquid vehicle. From 0.001% to 2.0% by weight, for example, can be used. Viscosity modifiers and buffers may also be present, as well as other additives known to those skilled in the art to modify properties of the liquid vehicle as desired. Such additives can be present at from 0.01% to 20% by weight.

In accordance with embodiments of the present invention, the use of the calcium aluminate particulates and other additives as described herein can form a dry cement mix that, when hydrated, forms an advanced composite material that is substantially devoid of macropore defects or large flaws. This property can provide a finished cement that possesses good mechanical, physical, and chemical properties. Additionally, the presence of a polymeric material in the cement can also improve the properties of the cement. For example, the polymer can fill pores that may otherwise exist between cement particles, or can act as a lubricant. This can enhance the close packing of the cement particles (hence low porosity), and react, such as through cross-linking, with the cement hydration product.

To provide an example, one can consider a particulate blend of calcium aluminate and polyvinyl alcohol (PVA). In the presence of water, calcium aluminate can undergo the following reaction:

$$2\ CaAl_2O_4(s) + 8\ H_2O(l) \rightarrow 2\ Ca^{2+}(aq) + 4Al(OH)_4^-(aq) \tag{1}$$

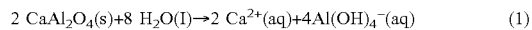

As the aluminate ions disassociate from the calcium, the aluminate ions can then crosslink the PVA through a polycondensation reaction as shown below:

$$4(CH_2CHOH)_n + nAl(OH)_4^- \rightarrow n[(CH_2-CHO)_4Al]^- + 4nH_2O \tag{2}$$

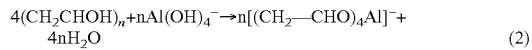

In reaction 2 above, n can be from 40 to 2,500. Structurally, the cross-linked product can be shown as follows:

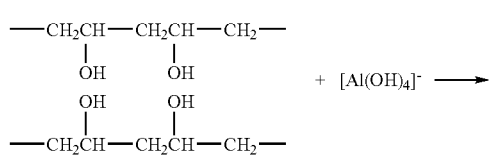

-continued

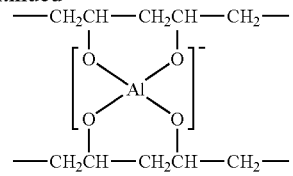

The water produced in this reaction can also react with additional calcium aluminate to form the metastable hydration product, shown in Reaction (3) below:

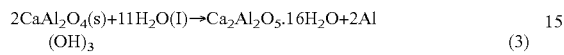

During the formation of the cement hydration products, the polymer, and other additives can be trapped in the matrix resulting in a three dimensional microstructure.

Though not shown in the above reaction schemes 1-3, the presence of an aqueous polyol can enhance the hydration and solubility properties of the polymeric binder and calcium aluminate particulates during cement formation. Furthermore, metal ions released from calcium aluminate can crosslink with the polyol to further enhance the mechanical properties of the finished cement.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Several powder compositions were prepared in accordance with embodiments of the present invention. Each particulate blend composition prepared included a predominant amount of particulate calcium aluminate and a smaller amount of particulate polymeric binder, as well as other optional ingredients. The particulate blend compositions prepared are shown below as Table 1:

TABLE 1

| Formula | Ingredients | Wt % |
|---|---|---|
| 1 | calcium aluminate | 90 |
|   | polyvinyl alcohol/CAC composite | 5 |
|   | polyacrylamide-co-acrylic acid | 5 |
| 2 | calcium aluminate | 90 |
|   | polyvinyl alcohol (88% hydrolyzed) | 8 |
|   | $Li_2CO_3$ | 2 |
| 3 | calcium aluminate | 85 |
|   | polyvinyl alcohol (88% hydrolyzed) | 5 |
|   | polyacrylamide-co-acrylic acid | 2.5 |
|   | PEO-clay nanocomposite | 7.5 |

TABLE 1-continued

| Formula | Ingredients | Wt % |
|---|---|---|
| 4 | calcium aluminate | 85 |
|   | polyvinyl alcohol (88% hydrolyzed) | 5 |
|   | $Li_2CO_3$ | 5 |
|   | PEO-clay nanocomposite | 5 |
| 5 | calcium aluminate | 75 |
|   | ordinary Portland cement | 10 |
|   | polyvinyl alcohol (88% hydrolyzed) | 5 |
|   | $Li_2CO_3$ | 5 |
|   | PEO-clay nanocomposite | 5 |
| 6 | calcium aluminate | 75 |
|   | ordinary Portland dry cement mix | 7 |
|   | PEO-clay nanocomposite | 3 |
|   | polyvinyl alcohol (88% hydrolyzed) | 5 |
|   | polyacrylamide-co-acrylic acid | 2.5 |
|   | calcium sulfate - $CaSO_4$ | 5 |
|   | calcium formate - $Ca(C_2O_4)_2$ | 2.5 |
| 7 | calcium aluminate (w/16 wt % $Fe_2O_3$) | 80 |
|   | nanoclay | 7.5 |
|   | polyacrylamide | 10 |
|   | PEG 2000 | 2.5 |

The particulate blend compositions described in Table 1 above can be used in accordance with embodiments of the present invention. Formulas 2, 4, and 5 provide a lithium ion source present in the particulate blend. However, this is not required. If a lithium ion source is used to facilitate accelerated setting and drying, it can alternatively or additionally be present in the liquid vehicle.

Example 2

Several liquid vehicles were prepared in accordance with embodiments of the present invention. Each liquid vehicle composition prepared included a predominant amount of water and a polyol, as well as other optional ingredients. The liquid vehicle compositions prepared are shown below as Table 2:

TABLE 2

| Formula | Ingredient | Wt % |
|---|---|---|
| 8 | glycerol | 6 |
|   | $Li_2CO_3$ | 1.5 |
|   | Surfynol 465 | 2 |
|   | water | balance |
| 9 | pentaerythriol | 0.2 |
|   | glycerol | 6 |
|   | Liponics EG-1 (ethyloxylated glycerol) | 1 |
|   | Surfynol 465 | 2 |
|   | 2,5-dimethylpropanediol | 0.75 |
|   | $Li_2CO_3$ | 1.5 |
|   | poly(vinyl alcohol-co-acetate) copolymer | 0.2 |
|   | Magenta M377 (Na salt) | 2 |
|   | water | balance |
| 10 | glycerol | 12 |
|   | Liponics EG-1 (ethyloxylated glycerol) | 2 |
|   | 1,5-pentanediol | 1.5 |
|   | Li-Citrate | 1.5 |
|   | Surfynol 465 | 2.5 |
|   | 2,5-dimethylpropanediol | 0.5 |
|   | ethyl diethanolamine | 2 |
|   | polyethylene glycol | 0.2 |
|   | Direct Blue 199 (Na salt) | 3 |
|   | water | balance |
| 11 | pentaerythriol | 1.5 |
|   | glycerol | 10 |
|   | Liponics EG-1 (ethyloxylated glycerol) | 2 |
|   | Surfynol 465 | 0.5 |
|   | 2,5-dimethylpropanediol | 0.5 |
|   | ethyl diethanolamine | 1.5 |

TABLE 2-continued

| Formula | Ingredient | Wt % |
|---|---|---|
|  | $Li_2CO_3$ | 1 |
|  | poly(vinyl alcohol-co-acetatel) copolymer | 0.15 |
|  | Direct Yellow 132 (Na salt) | 3 |
|  | water | balance |
| 12 | pentaerythriol | 3 |
|  | glycerol | 7.5 |
|  | Liponics EG-1 (ethyloxylated glycerol) | 5 |
|  | 1,5-pentanediol | 3.5 |
|  | Li-Citrate | 0.75 |
|  | Surfynol 465 | 2.5 |
|  | 2,5-dimethylpropanediol | 0.5 |
|  | $Li_2CO_3$ | 2 |
|  | polyethylene glycol | 0.15 |
|  | Magenta M377 (Na salt) | 2 |
|  | water | balance |
| 13 | pentaerythriol | 3 |
|  | glycerol | 8.5 |
|  | Liponics EG-1 (ethyloxylated glycerol) | 5 |
|  | 1,5-pentanediol | 3.5 |
|  | Surfynol 465 | 3 |
|  | 2,5-dimethylpropanediol | 0.75 |
|  | ethyl diethanolamine | 3 |
|  | poly(vinyl alcohol-co-acetatel) copolymer | 0.2 |
|  | Direct Blue (Na salt) | 3 |
|  | water | balance |

The liquid vehicle compositions described in Table 2 above can be used in accordance with embodiments of the present invention. Formulas 8-12 each include a lithium ion source, which can be used to accelerate setting and drying of hydrated cements of the present invention. Formula 13 does not include a lithium ion source, but still can be used with particulate blends in accordance with embodiments of the present invention, either with lithium ion source-containing powder compositions, or without.

Example 3

The dry particulate blend (dry cement mix) of Formula 6 was spread out as a first powder layer on a substrate. The liquid vehicle of Formula 10 was then applied to the powder layer using a thermal ink-jet pen manufactured by Hewlett-Packard Company. A first layer of cement having a predetermined shape was formed. After 20 to 40 seconds of setting, a second particulate blend layer was applied to the first layer of cement. Additional liquid vehicle was then applied to the second powder layer, thereby forming a second layer of cement. This procedure was continued, adding layer upon layer, until the desired three-dimensional object was formed. After allowing the composition to set and dry, the multiple layers of cement were bound together with good adhesion, and the three-dimensional object formed was substantially smooth, having surface pores no larger than about 10 microns on average.

While the present invention has been described with reference to certain preferred embodiments, those skilled in the art will appreciate that various modifications, changes, omissions, and substitutions can be made without departing from the spirit of the invention. It is to be understood that the present invention is not limited to the disclosed embodiments. The invention is intended to cover various modifications and equivalent arrangements included within the spirit and scope of the claims. Therefore, it is intended that the invention be limited only by the scope of the following claims, where the claims are to be given the broadest interpretation so as to encompass all such modifications and equivalent arrangements.

What is claimed is:

1. A method for solid free-form fabrication of a three-dimensional object, comprising:
   a) applying a particulate blend in a layer, said particulate blend including calcium aluminate particulates and polymeric binder particulates;
   b) ink-jetting an aqueous polyol-containing liquid vehicle onto an area of the particulate blend to form hydrated cement in the area, wherein the hydrated cement becomes crosslinked;
   c) hardening the hydrated cement; and
   d) repeating steps a) through c) such that multiple layers of the cement are formed that are bound to one another, thereby forming the three dimensional object.

2. A method as in claim 1, wherein the aqueous polyol-containing liquid vehicle is dispensed onto the area of the particulate blend by ink-jetting.

3. A method as in claim 1, further comprising the step of removing a portion of the particulate blend that does not form the hydrated cement.

4. A method as in claim 1, wherein the polymeric binder particulates are selected from the group consisting of 75% to 100% hydrolyzed polyvinyl alcohol powder, polyacrylamide powder, poly(acrylic acid), poly(acrylamide-co-acrylic acid), poly(vinyl alcohol-co-ethylene), poly(vinyl alcohol-co-vinyl acetate-co-itaconic acid), poly(vinyl pyrrolidone), poly(methylmethacrylate-co-methacrylic acid), soluble starch, methylcellulose, and combinations thereof.

5. A method as in claim 1, wherein the polyol of the liquid vehicle is selected from the group consisting of glycerol, ethoxylated glycerol, and combinations thereof.

6. A method as in claim 1, wherein the polyol of the liquid vehicle is polyethylene glycol having a weight average molecular weight from 200 Mw to 2000 Mw.

7. A method as in claim 1, wherein the step of hardening is accelerated by including a particulate lithium ion source in the particulate blend.

8. A method as in claim 1, wherein the step of hardening is accelerated by including a solvated lithium ion source in the liquid vehicle.

9. A method as in claim 1, wherein the liquid vehicle further includes a colorant.

10. A method as in claim 1, wherein the liquid vehicle further comprises a low molecular weight polymer having a weight average molecular weight from 200 Mw to 2000 Mw.

11. A method as in claim 1, wherein the calcium aluminate particulates have an average particulate size from 10 microns to 80 microns, and wherein the polymeric binder particulates have an average particulate size from 0.5 microns to 80 microns.

12. A method for solid free-form fabrication of a three-dimensional object, comprising:
   a) applying a particulate blend in a layer, said particulate blend including calcium aluminate particulates and polymeric binder particulates;
   b) ink-jetting an aqueous polyol-containing liquid vehicle onto an area of the particulate blend to form hydrated cement in the area;
   c) hardening the hydrated cement, wherein the step of hardening is accelerated by including a particulate lithium ion source in the particulate blend or a solvated lithium ion source in the liquid vehicle; and
   d) repeating steps a) through c) such that multiple layers of the cement are formed that are bound to one another, thereby forming the three dimensional object.

13. A method as in claim 12, wherein the aqueous polyol-containing liquid vehicle is dispensed onto the area of the particulate blend by ink-jetting.

14. A method as in claim 12, further comprising the step of removing a portion of the particulate blend that does not form the hydrated cement.

15. A method as in claim 12, wherein the polymeric binder particulates are selected from the group consisting of 75% to 100% hydrolyzed polyvinyl alcohol powder, polyacrylamide powder, poly(acrylic acid), poly(acrylamide-co-acrylic acid), poly(vinyl alcohol-co-ethylene), poly(vinyl alcohol-co-vinyl acetate-co-itaconic acid), poly(vinyl pyrrolidone), poly(methylmethacrylate-co-methacrylic acid), soluble starch, methylcellulose, and combinations thereof.

16. A method as in claim 12, wherein the poiyol of the liquid vehicle is selected from the group consisting of glycerol, ethoxylated glycerol, and combinations thereof.

17. A method as in claim 12, wherein the polyol of the liquid vehicle is polyethylene glycol having a weight average molecular weight from 200 Mw to 2000 Mw.

18. A method as in claim 12, wherein the step of hardening is accelerated by including the particulate lithium ion source in the particulate blend.

19. A method as in claim 12, wherein the step of hardening is accelerated by including the solvated lithium ion source in the liquid vehicle.

20. A method as in claim 12, wherein the liquid vehicle further includes a colorant.

21. A method as in claim 12, wherein the liquid vehicle further comprises a low molecular weight polymer having a weight average molecular weight from 200 Mw to 2000 Mw.

22. A method as in claim 12, wherein the calcium aluminate particulates have an average particulate size from 10 microns to 80 microns, and wherein the polymeric binder particulates have an average particulate size from 0.5 microns to 80 microns.

* * * * *

UNITED STATES PATENT AND TRADEMARK OFFICE
CERTIFICATE OF CORRECTION

PATENT NO. : 7,258,736 B2 Page 1 of 1
APPLICATION NO. : 10/603405
DATED : August 21, 2007
INVENTOR(S) : Christopher Oriakhi et al.

It is certified that error appears in the above-identified patent and that said Letters Patent is hereby corrected as shown below:

In column 6, line 50, in equation (1),
delete "2 $CaAl_2O_4(s)+8\ H_2O(l) \rightarrow 2\ Ca^{2+}(aq)+4Al(OH)_4^-(aq)$" and
insert -- 2 $CaAl_2O_4(s)+8\ H_2O(l) \rightarrow 2\ Ca^{2+}(aq)+4Al(OH)_4^-(aq)$ --, therefor.

In column 7, lines 15-16, in equation (3),
delete "$2CaAl_2O_4(s)+11H_2O(l) \rightarrow Ca_2Al_2O_5.16H_2O+2Al(OH)_3$" and
insert -- $2CaAl_2O_4(s)+11H_2O(l) \rightarrow Ca_2Al_2O_5.16H_2O+2Al(OH)_3$ --, therefor.

In column 11, line 15, in Claim 16, delete "poiyol" and insert -- polyol --, therefor.

Signed and Sealed this

Twenty-eighth Day of April, 2009

JOHN DOLL
*Acting Director of the United States Patent and Trademark Office*